United States Patent [19]
Hagel et al.

[11] 4,363,679
[45] Dec. 14, 1982

[54] USE OF ZINC PEROXIDE AS OXIDANT FOR EXPLOSIVES AND PYROTECHNICAL MIXTURES

[75] Inventors: Rainer Hagel, Lichtenfels; Klaus Redecker, Nuremberg, both of Fed. Rep. of Germany

[73] Assignee: Dynamit Nobel Aktiengesellschaft, Troisdorf, Fed. Rep. of Germany

[21] Appl. No.: 217,220

[22] Filed: Dec. 17, 1980

[30] Foreign Application Priority Data

Dec. 22, 1979 [DE] Fed. Rep. of Germany ....... 2952069

[51] Int. Cl.³ .............................................. C06B 33/00
[52] U.S. Cl. ........................................ 149/37; 149/44; 149/38; 149/39; 149/92; 149/93; 149/105; 149/96

[58] Field of Search ....................... 149/44, 37, 38, 39, 149/92, 93, 96, 105

[56] References Cited

U.S. PATENT DOCUMENTS

| | | | |
|---|---|---|---|
| 1,318,709 | 10/1919 | Vautin | 149/37 |
| 2,123,691 | 7/1938 | Burrows et al. | 149/37 |
| 2,409,201 | 10/1946 | Finkelstein | 149/37 |
| 3,625,855 | 12/1971 | Douda | 149/37 |

*Primary Examiner*—Stephen J. Lechert, Jr.
*Attorney, Agent, or Firm*—Antonelli, Terry & Wands

[57] ABSTRACT

A process for promoting the oxidation of an explosive-containing mixture or a pyrotechnical mixture involves utilizing zinc peroxide as the sole or predominant oxidant in the mixture. Preferably the zinc peroxide has an available oxygen content of more than 12.3% by weight.

15 Claims, No Drawings

USE OF ZINC PEROXIDE AS OXIDANT FOR EXPLOSIVES AND PYROTECHNICAL MIXTURES

The present invention relates to the use of zinc peroxide as an oxidant and oxygen donor in compositions or mixtures containing explosive materials. Such compositions are, for example, explosives or pyrotechnical compositions.

The production of inorganic peroxides is known per se. Heretofore, only barium and strontium peroxides have been used among the conventional inorganic peroxides as an oxidant for use in explosives or in pyrotechnics. Thus, barium peroxide is used for producing hydrogen peroxide and in igniters (with Mg powder), as well as in aluminothermics or with a peroxide, such as strontium peroxide, in pyrotechnics. The preparation of zinc peroxide is generally conducted in a different way than that of barium peroxide, namely by treating zinc hydroxide with $H_2O_2$. Zinc peroxide is commercially available in a "cosmetic" quality and a "medical" quality. It is used in medicine and cosmetics, furthermore, as a preservative. Nothing is known about using zinc peroxide as an oxidant for explosives and/or in pyrotechnics.

The disadvantage of the peroxides of barium and strontium heretofore employed as oxidants for explosives and pyrotechnics resides, on the one hand, in the basic reaction products obtained after the oxidation reaction and the adverse effect of such reaction products on the corrosion resistance of the metallic materials present. Furthermore, such peroxides are very susceptible to the effects of atmospheric moisture, forming hydrolysates having a lower proportion of available oxygen. Barium peroxide furthermore exhibits the great disadvantage that barium compounds injurious to health are formed during the combustion reaction.

Therefore, the problem exists in discovering an oxidant for explosive materials, especially for blasting agents and pyrotechnics, which will eliminate the afore-described disadvantages.

In solving this problem, it has now been found that zinc peroxide represents a suitable oxidant for explosives and pyrotechnical compositions or mixtures. By means of the zinc-containing reaction products, the corrosion of metallic materials in a moist atmosphere can be drastically reduced, and the MAK [maximum working place concentration] values of zinc—as compared to those of the barium compounds—prove that danger to health is thus reduced by a factor of 10.

Explosive materials usable as components for the reaction with zinc peroxide are primary and secondary, e.g. booster, explosives, as well as pyrotechnical mixtures.

The expression "primary or initiator explosives" is understood to mean explosives utilized for the short-term ignition of other explosives. Among these are salts of trinitroresorcinol or salts of trinitrophenol, especially the lead and barium compounds thereof, as well as metallic salts of mono- and dinitrodihydroxydiazobenzenes and salts of hydrazoic acid, e.g. lead azides; however, also included are metal-free compounds, such as, for example, diazodinitrophenol, nitroform phenyldiazonium [phenyldiazonium trinitromethane], tetrazene, or nitrogen tetrasulfide. The initiator explosives can be present in the igniter and initiator charges, respectively, as the sole component or also in a mixture with one another.

Mixtures of such initiator explosives, oxidants, and friction agents are generally present in igniter and initiator charges. These charges also contain additionally a reductant or reducing agent in some cases.

To produce igniter and initiator charges, friction agents, such as glass, antimony sulfide, or calcium silicide, are admixed to the initiator explosives or the mixture thereof; the task of such friction agents is, in part, to raise the mechanical sensitivity and, in part, to improve the igniting characteristic. According to this invention zinc peroxide, by itself or in a mixture with other oxidants, is employed as the oxidant in such mixtures in place of the barium compounds used heretofore. In this case, the above-mentioned disadvantages inherent in the barium compounds, e.g. barium nitrate, no longer occur.

Metals, alloys, or intermetallic compounds, e.g. calcium silicide, serve as the reductants in the igniter and initiator charges. The usable metals or metallic alloys and compounds are known per se. Moreover, the igniter and initiator charges can contain additional, conventional additives, especially secondary explosives. Examples for such secondary explosives are nitrocellulose or pentaerythritol tetranitrate (PETN).

The amount of zinc peroxide used in the igniter and initiator charges depends on the type and quantity of the accompanying substances. Igniter charges having a proportion of 10–30% by weight of the initiator explosives, and 0–10% by weight of a reductant, require generally 50–60% by weight of zinc peroxide.

The preparation of the igniter charges containing zinc peroxide according to the invention takes place by following conventional methods, by screening of the dry mixture or kneading of the water-moist mixture. The metering of the moist mass can take place by spreading into perforated plates or by extrusion devices.

Zinc peroxide, however, is useful as an oxidant in explosive mixtures, not only in a blend with initiators in igniter and initiator charges, but also in a mixture with secondary explosives or in pyrotechnical mixtures. Examples for secondary explosives have been cited above, namely nitrocellulose and pentaerythritol tetranitrate (PETN). Additional examples are mixtures with octogen, as well as mixtures with secondary explosives exhibiting a large negative oxygen balance. Among these are, for example, amino compounds of nitrated aromatics, e.g. trinitrobenzene, such as mono-, di- or triamino-trinitrobenzene or diaminohexanitrodiphenyl, furthermore the acylation products of these compounds, e.g. hexanitrooxanilide or hexanitrodiphenylurea. Furthermore, other examples of these secondary explosives are hexanitrostilbene, hexanitrodiphenyl oxide, hexanitrodiphenyl sulfide, hexanitrodiphenylsulfone, and hexanitrodiphenylamine, as well as tetranitrocarbazole, tetranitroacridone, or polyvinyl nitrate.

When using zinc peroxide in pyrotechnical mixtures, such a mixture contains in some cases additional oxidants, as well as reductants. Suitable reductants are metals or metallic alloys. Thus, mixtures of zinc peroxide react, for example, with titanium, zirconium, magnesium, or cerium-magnesium extremely violently, in part, under detonation. The proportion of zinc peroxide in these mixtures ranges suitably between 40 and 60% by weight, preferably between 45 and 55% by weight, based on the total weight. However, it is also possible to utilize other, less violently reacting metals or the compounds thereof, e.g. powdered iron, nickel, or tantalum, or calcium-silicon or cerium-silicon compounds. These metals or metallic compounds can also be used in a mixture with the above-mentioned metals. Partially, the reaction proceeds under red heat when using these metals.

Besides metals and/or metallic compounds, the pyrotechnical mixtures can also contain organic reductants, e.g. polyoxymethylene, lactose, or polyethylene. In these cases, for example, with a weight ratio of zinc peroxide/reductant of 85/15, a vigorous reaction is obtained. When using organic reductants, it is possible for the zinc peroxide content in the pyrotechnical mixtures to be up to 90% by weight.

Moreover, suitable pyrotechnical mixtures are also those containing as the reductants metals in the pure form or as an alloy or component of a compound, as well as additional reductants. A preferred embodiment contains reductants capable of serving simultaneously as binders.

These binders comprise thermoplastic polymers. Among these polymers are, for example, those polymers obtained by reacting polyvinyl alcohol with aldehydes having a carbon content of 1-6 carbon atoms, especially butyraldehyde. These polymers are also called polyvinyl acetals. Furthermore suitable as binders are those substances employed as bifunctional compounds and which, after mixing with the pyrotechnical components, are subject to crosslinking, for example, triggered radically, or subject to condensation. Among these are, for example, also methyl methacrylates, polybutadienes, and the derivatives thereof, polyurethanes, or acrylonitriles.

Understandably, those binders are of special interest which alone can contribute energy and oxygen toward the reaction. Such binders are, for instance, cellulose nitrates, polyvinyl nitrates, or polynitropolyphenylene.

The invention will be described in greater detail with reference to the following examples:

EXAMPLE 1

Preparation of Zinc Peroxide

In a 6-liter three-necked flask equipped with an agitator, a contact thermometer, a reflux condenser, and a dropping funnel, 1438 g (5 moles) of $ZnSO_4.7H_2O$ is dissolved in 750 ml of water under heating and to this solution 1.5 liters of a concentrated solution of ammonia in water is quickly added. During this step, the precipitated $Zn(OH)_2$ is redissolved. At a temperature of 80° C., 1.5 liters of 30% strength $H_2O_2$ is added in increments of, respectively, 100 ml so rapidly that frothing remains under control. The temperature can also be maintained at 95°–100° C. up to a vigorous refluxing of the solution. This procedure lasts about 1 hour. After the addition of $H_2O_2$ is completed, the mixture is stirred for another 10 minutes, then vacuum-filtered in the hot state, and washed with water until the filtrate is free of sulfate. The residue is dried at room temperature. The following table gives the yields and a number of properties of the resulting zinc peroxide in dependence on the reaction temperature:

TABLE 1

| Reaction Temperature (°C.) | Yield (Approx. g) | O—Proportion (wt. %) | Bulk Density (g/cm³) | Color |
|---|---|---|---|---|
| 80 | 300 | 13.0 | 0.88 | Light yellow |
| 85 | 350 | 13.4 | 1.30 | Light yellow |
| 90 | 350 | 12.8 | 1.40 | Light yellow |

TABLE 1-continued

| Reaction Temperature (°C.) | Yield (Approx. g) | O—Proportion (wt. %) | Bulk Density (g/cm³) | Color |
|---|---|---|---|---|
| Reflux | 400 | 12.5 | 1.70 | Yellowish |

By increasing at 85° and 90° C., the amount of $H_2O_2$ employed from 1.5 l to 2.0 l, then the yield of zinc peroxide is raised to 400 g with a bulk density of 1.45 g/cm³. The product obtained at this reaction temperature exhibits a pourable, crystalline structure. The addition of $H_2O_2$ must be performed quickly. Gradual, dropwise addition impairs the yield. The grain size ranges generally below 0.1 mm, the decomposition temperature is 200° C.

Instead of zinc sulfate as disclosed in this example, other water-soluble zinc salts can likewise be employed as the starting material, e.g. zinc chloride or zinc acetate.

The determination of the oxygen proportion (O proportion in Table 1) took place by adding 1 g of KI to 100 mg of zinc peroxide in 20 ml of $H_2O$. After acidifying with about 5 ml of semiconcentrated $H_2SO_4$, the mixture was supplemented with water to 100 ml in a measuring flask and titrated with 0.1 N sodium thiosulfate solution. The proportion of active oxygen results from the formula $$O \text{ Proportion } (\%) = \frac{80 \cdot \text{Consumption (ml)}}{\text{Weighted Amount (mg)}}$$

In the literature, the formula for zinc peroxide is indicated with $3ZnO_2.Zn(OH)_2$ corresponding to an available "O proportion" of 12.3%. The zinc peroxide preferably employed according to the invention, accordingly, has an increased active oxygen proportion of above 12.3% by weight.

EXAMPLE 2

Use of Zinc Peroxide in Igniter Charges

With the addition of 30 g of water, 15 g of lead trinitroresorcinate or diazodinitrophenol, 3 g of tetrazene, 50 g of zinc peroxide, and 5 g of titanium powder having a grain size of 40 μm, as well as 27 g of a double-base bullet powder were mixed together, and the moist composition was spread into a perforated plate. After ejection into metal cups having a caliber of 4.45 mm, the products were dried, compacted, and covered as usual. The ignition of the propellant charge powder in cartridges tested with these primer caps corresponded to usual requirements. With an igniter charge of a similar composition, containing 10% by weight of diazodinitrophenol and 32% by weight of bullet powder as well as, instead of the mixture of zinc peroxide, tetrazene, and titanium powder, a "Sinoxid" charge with lead trinitroresorcinate as the initiator and barium nitrate as the oxidant, the following data were determined with the ammunition 9 mm Parabellum as a comparison:

TABLE 2

|  | Example 2 | Comparison |
|---|---|---|
| Maximum pressure (bar) | 2336 | 2009 |
| (Standard deviation) | 104 | 108 |
| Projectile velocity after 6 m (m/s) | 403 | 394 |
| (Standard deviation) | 4.7 | 8.9 |

Accordingly, with the igniter charge of the example of this invention the amount of propellant charge powder can be reduced for obtaining equivalent data.

EXAMPLES 3-15

Use of Zinc Peroxide in Pyrotechnical Mixtures

The following Examples 3-15 contain zinc peroxide in pyrotechnical mixtures and describe the reactive behavior of such mixtures during reaction after ignition by flame. The individual mixtures were obtained conventionally by mixing the respective materials, on a weight % basis.

The results are compiled in Table 3 below.

TABLE 3

| Example No. | 3 | 4 | 5 | 6 | 7 | 8 | 9 | 10 | 11 | 12 | 13 | 14 | 15 | Reaction |
|---|---|---|---|---|---|---|---|---|---|---|---|---|---|---|
| Zinc Peroxide | 50 | 50 | 50 | 50 | 50 | 50 | 50 | 50 | 85 | 85 | 85 | 85 | 85 | |
| Calcium silicide | 50 | | | | | | | | | | | | | gradual |
| Iron powder <100 μm | | 50 | | | | | | | | | | | | red heat |
| Tantalum powder | | | 50 | | | | | | | | | | | gradual |
| Magnesium powder | | | | 50 | | | | | | | | | | violent |
| Titanium powder <40 μm | | | | | 50 | | | | | | | | 5 | very violent |
| Zirconium powder | | | | | | 50 | | | | | | | | very violent |
| Cerium—Silicon | | | | | | | 50 | | | | | | | very gradual |
| Cerium—Magnesium | | | | | | | | 50 | | | | | | detonation |
| "Delrin" | | | | | | | | | 15 | | | | 10 | vigorous |
| Lactose | | | | | | | | | | 15 | | | | vigorous |
| Polyvinylbutyral | | | | | | | | | | | 15 | | | vigorous |
| Polyethylene | | | | | | | | | | | | 15 | | vigorous |

The ternary mixture in Example 15 reacts under moderately rapid deflagration of the components.

Evaluation of the reaction was conducted after a readily producible ignition in loose bulk. Pressed charges were likewise prepared from the same mixtures. These were ignited just as readily, but the reaction of a pressed charge is somewhat more violent than that of the loosely packed powder.

We claim:

1. A process for promoting the oxidation of an explosive-containing mixture or a pyrotechnical mixture which comprises utilizing zinc peroxide as the sole or predominant oxidant in said mixture.

2. A process according to claim 1, wherein the zinc peroxide that is utilized has an available oxygen proportion of more than 12.3% by weight.

3. A process according to claim 1 or claim 2, wherein the zinc peroxide is used as a component of an igniter or initiator charge.

4. A process according to claim 1 or claim 2, wherein the zinc peroxide is used in a mixture with secondary explosives.

5. A process according to claim 1 or claim 2, wherein the zinc peroxide is used in pyrotechnical mixture containing metals or compounds thereof, reductants, and other oxidants.

6. A process according to claim 1 or claim 2, wherein said pyrotechnical mixture also contains magnesium, nickel, titanium or zirconium.

7. A process according to claim 1 or claim 2, wherein said pyrotechnical mixture contains reductants comprised of organic polymeric compounds.

8. An explosive or pyrotechnical mixture which contains zinc peroxide as the sole or predominant oxidant.

9. An explosive or pyrotechnical mixture according to claim 8, wherein the zinc peroxide that is utilized has an available oxygen proportion of more than 12.3% by weight.

10. An explosive or pyrotechnical mixture according to claim 8, wherein the zinc peroxide is used as a component of an igniter or initiator charge.

11. An explosive or pyrotechnical mixture according to claim 8, wherein the zinc peroxide is used in a mixture with secondary explosives.

12. An explosive or pyrotechnical mixture according to claim 8, wherein the zinc peroxide is used in pyrotechnical mixture containing metals or compounds thereof, reductants, and other oxidants.

13. An explosive or pyrotechnical mixture according to claim 8, wherein said pyrotechnical mixture also contains magnesium, nickel, titanium or zirconium.

14. An explosive or pyrotechnical mixture according to claim 8, wherein said pyrotechnical mixture contains reductants comprised of organic polymeric compounds.

15. An explosive or pyrotechnical mixture according to claim 8, wherein said pyrotechnical mixture contains zinc peroxide as the sole or predominant oxidant.

* * * * *